United States Patent [19]
Nakarai et al.

[11] Patent Number: 4,591,937
[45] Date of Patent: May 27, 1986

[54] HEAD MOUNTING ARRANGEMENT IN MAGNETIC CARD READER

[75] Inventors: Masazumi Nakarai, Anjo; Hitoshi Kamiya, Hekinan, both of Japan

[73] Assignee: Nippondenso Co., Ltd., Kariya, Japan

[21] Appl. No.: 473,673

[22] Filed: Mar. 8, 1983

[30] Foreign Application Priority Data

Mar. 9, 1982 [JP] Japan .................. 57-37398

[51] Int. Cl.$^4$ .................. G11B 25/04; G11B 3/40
[52] U.S. Cl. .................. 360/101; 360/2; 360/107
[58] Field of Search .................. 360/2, 81, 101, 104, 360/105, 107; 235/449, 480; 434/311, 312

[56] References Cited

U.S. PATENT DOCUMENTS

| | | | |
|---|---|---|---|
| 3,822,376 | 6/1974 | Kok et al. | 360/2 |
| 3,836,753 | 9/1974 | Pass | 235/449 |
| 3,872,501 | 3/1975 | McPherson | 360/2 |
| 3,940,796 | 2/1976 | Haun et al. | 360/109 |
| 3,961,371 | 6/1976 | Kobylarz et al. | 360/101 |
| 4,040,097 | 8/1977 | Mizuno | 360/2 |
| 4,087,680 | 5/1978 | Mack et al. | 235/449 |
| 4,151,564 | 4/1979 | Schreiber et al. | 360/2 |
| 4,237,624 | 12/1980 | Yeh | 360/2 |
| 4,309,601 | 1/1982 | Nally et al. | 235/449 |

FOREIGN PATENT DOCUMENTS

| | | |
|---|---|---|
| 2741473 | 3/1979 | Fed. Rep. of Germany . |
| 49-42912 | 4/1974 | Japan . |
| 49-43613 | 4/1974 | Japan . |
| 52-14664 | 4/1977 | Japan . |
| 54-10849 | 5/1979 | Japan . |
| 56-55789 | 12/1981 | Japan . |
| 526006 | 9/1976 | U.S.S.R. . |

*Primary Examiner*—Stuart N. Hecker
*Assistant Examiner*—David J. Severin
*Attorney, Agent, or Firm*—Cushman, Darby & Cushman

[57] ABSTRACT

A magnetic card reader of the moving head type in which a magnetic head is supported by a leaf spring on a supporting member horizontally. The leaf spring has an aperture at the center thereof to accommodate and support the magnetic head so that two wings of the leaf spring extend outwardly from opposite sides of the magnetic head in directions parallel with the reading direction or the direction in which the magnetic head travels carried by the supporting member. The leaf spring is supported by the supporting member so that a resilience is exerted against the magnetic card and also the magnetic head is rotatable about the axis along the two wings of the leaf spring by twisting the same.

14 Claims, 14 Drawing Figures

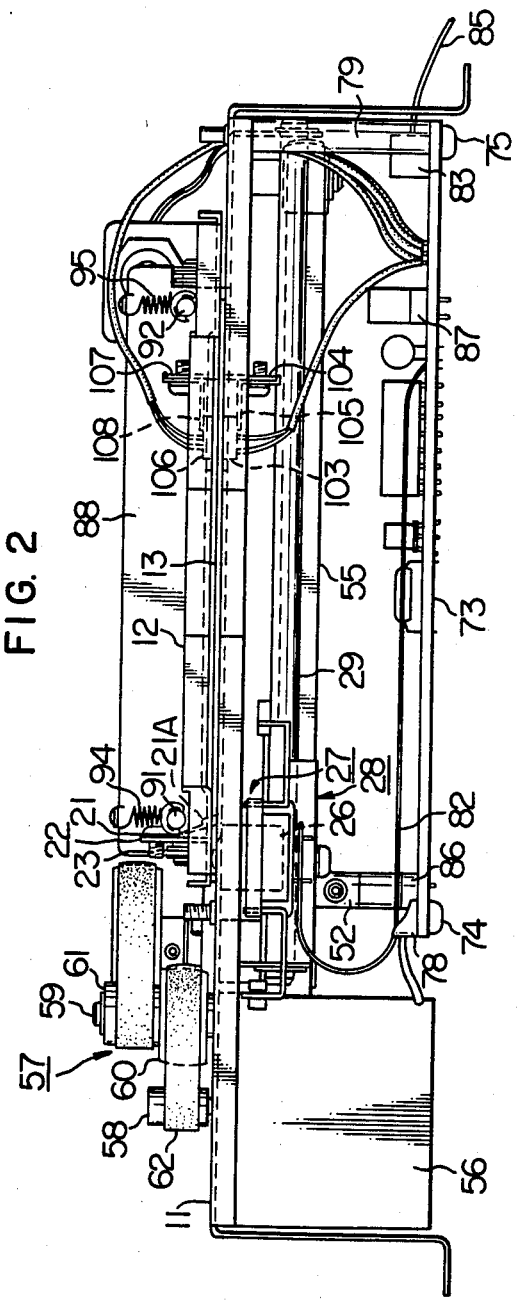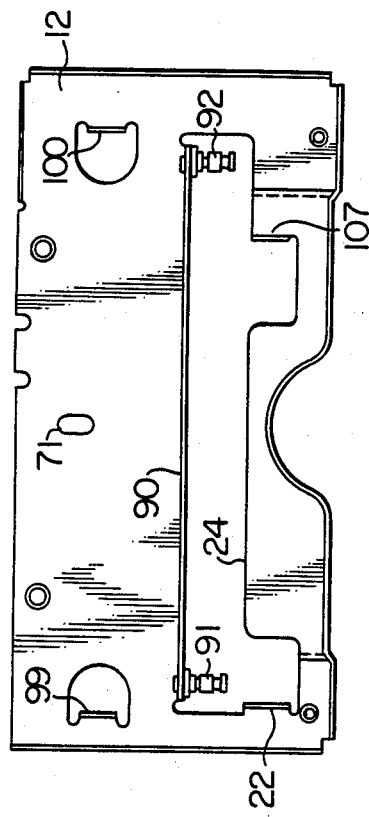

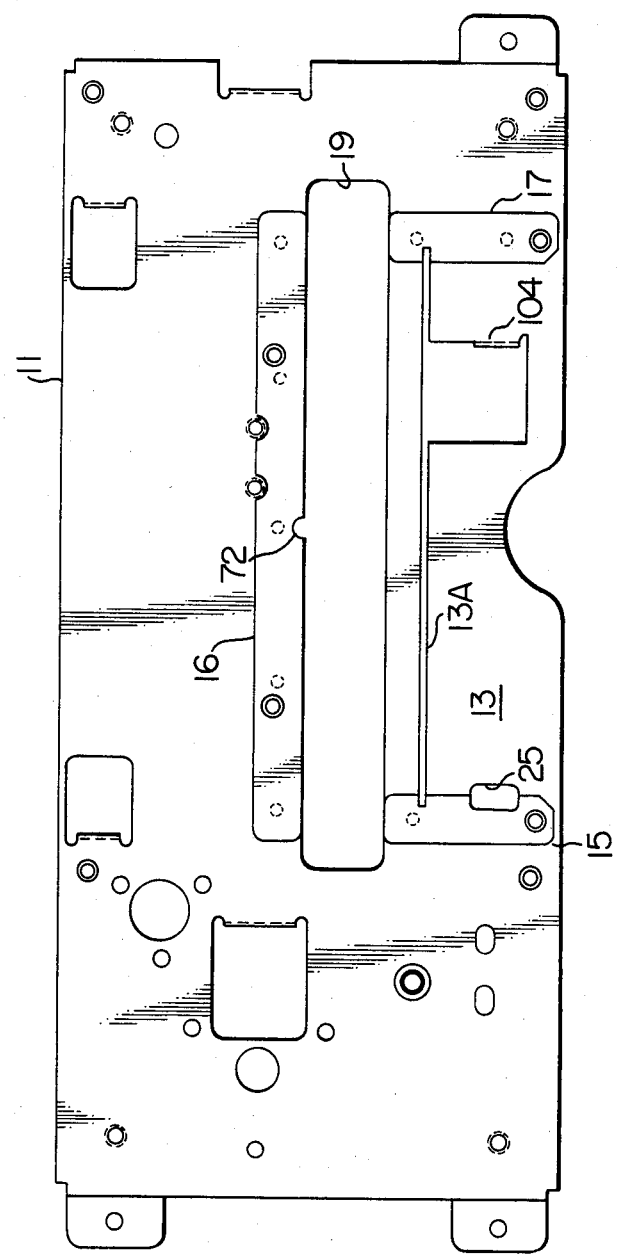

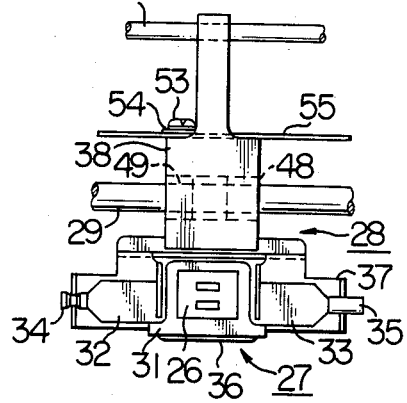
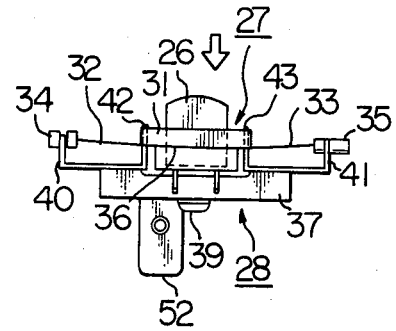
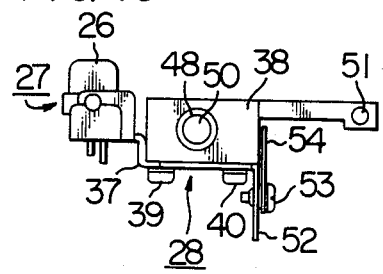
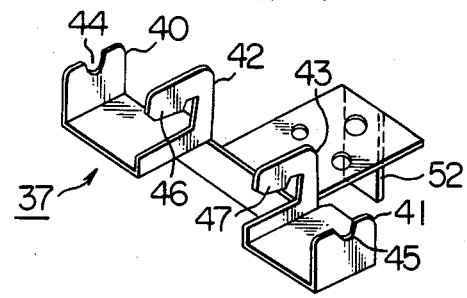
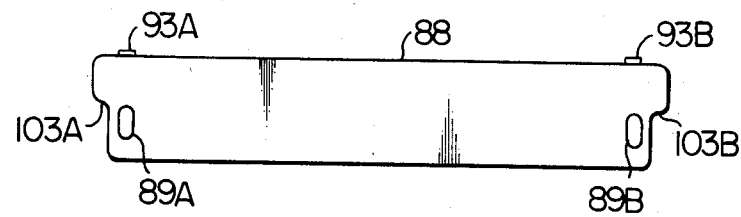
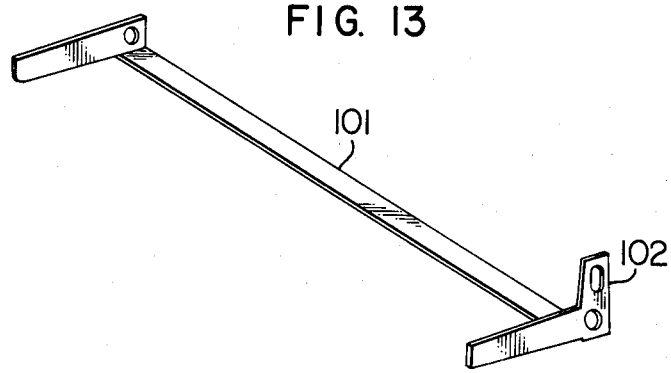

HEAD MOUNTING ARRANGEMENT IN MAGNETIC CARD READER

BACKGROUND OF THE INVENTION

1. FIELD OF THE INVENTION

The present invention relates to a magnetic card reader of a so-called moving head type in which a magnetic head is moved relative to a magnetic recording zone of a magnetic card held stationarily.

2. DESCRIPTION OF THE PRIOR ART

In the hitherto known magnetic card readers, it is common in practice that the magnetic card is moved relative to the magnetic head supported stationarily by a supporting member through manual operation or automatically with the aid of a motor drive mechanism. In consideration of the fact that the density at which information or data are recorded on the magnetic card is more and more increased or requirement imposed on the data reading accuracy becomes more severe, the automatic card moving system is regarded more desirable.

In the card reader apparatus of the automatic card feeding type, a series of operations inclusive of introducing the card manually inserted through an inlet into the card reader machine, feeding of the card at a predetermined speed within the machine, reading of magnetic information in the course of the movement of the card, and returning the card to the inlet or an exit port are automatically and mechanically carried out. In the card reader of this type, a failure occuring in the machine during the operation would cause the magnetic card to stop and be retained within the reader machine, making it impossible to return the card offhand to the possessor.

Under the circumstance, it is desirable that the magnetic card be partially exposed externally of the machine when information is being read out so that the card holder can use the card without anxiety.

SUMMARY OF THE INVENTION

It is an object of the present invention to provide a magnetic card reader apparatus in which a magnetic card is held partially exposed externally when information is being read out from the magnetic card and in which a relative movement between the magnetic card and a magnetic head is realized by an automatic driving system which can assure an improved accuracy of the information reading operation.

In view of the above object, it is proposed according to an aspect of the present invention that a card passage is provided which is so arranged as to permit the magnetic card to be inserted therein for a predetermined distance in a direction intersecting (orthogonal to) the direction in which an elongated magnetic recording zone of the card extends. The magnetic head is caused to move in the same direction as the longitudinal direction of the magnetic recording zone with an intimate contact between the magnetic head and the magnetic card being maintained during the movement of the magnetic head.

The magnetic head is integrally combined with a pair of resilient members extending in the information reading direction to constitute a movable assembly which is rotatably supported by a supporting assembly in the state in which the resilient members are elastically deformed. The supporting assembly is supplied with a driving power by a driving means to be reciprocatively moved under guidance of auxiliary means within a predetermined range defined in association with the card passage.

With this structure, the magnetic head is pressed against the inserted magnetic card through rotation of the magnetic head relative to the supporting assembly and/or under spring or restoring force of the resilient members regardless of deformation and/or inclination of the magnetic card.

It is another object of the present invention to provide a magnetic card reader apparatus in which positions of the magnetic head can be detected in a facilitated manner by installing detecting means for detecting the moving strokes of the magnetic head on a circuit plate or board.

It is a further object of the present invention to provide a magnetic card reader apparatus in which opening/closing means is provided at an intermediate location of the card passage to thereby permit or prohibit the insertion of the magnetic card in dependence on the detection of the presence or absence of the card while preventing foreign materials from entering the card passage.

BRIEF DESCRIPTION OF THE DRAWINGS

FIG. 2 is a front view of the same;

FIG. 5 is a plan view of a base constituting a part of the card reader;

FIG. 6 is a plan view of a holder constituting a part of the card reader;

FIG. 8 shows in a plan view a movable assembly (27) and a supporting assemably (28) also constituting parts of the card reader;

FIG. 9 is a front view of the movable assembly (27) and the supporting assembly (28);

FIG. 10 is a side view of the same as viewed from the right in FIG. 9;

FIG. 11 is a perspective view showing a holding fixture constituting a part of the card reader;

FIG. 12 is a front view of an intercepting member (88) also constituting a part of the card reader;

FIG. 13 shows in a perspective view a lifting like (101) constituting a part of the card reader.

DESCRIPTION OF THE PREFERRED EMBODIMENTS

Figure 1:
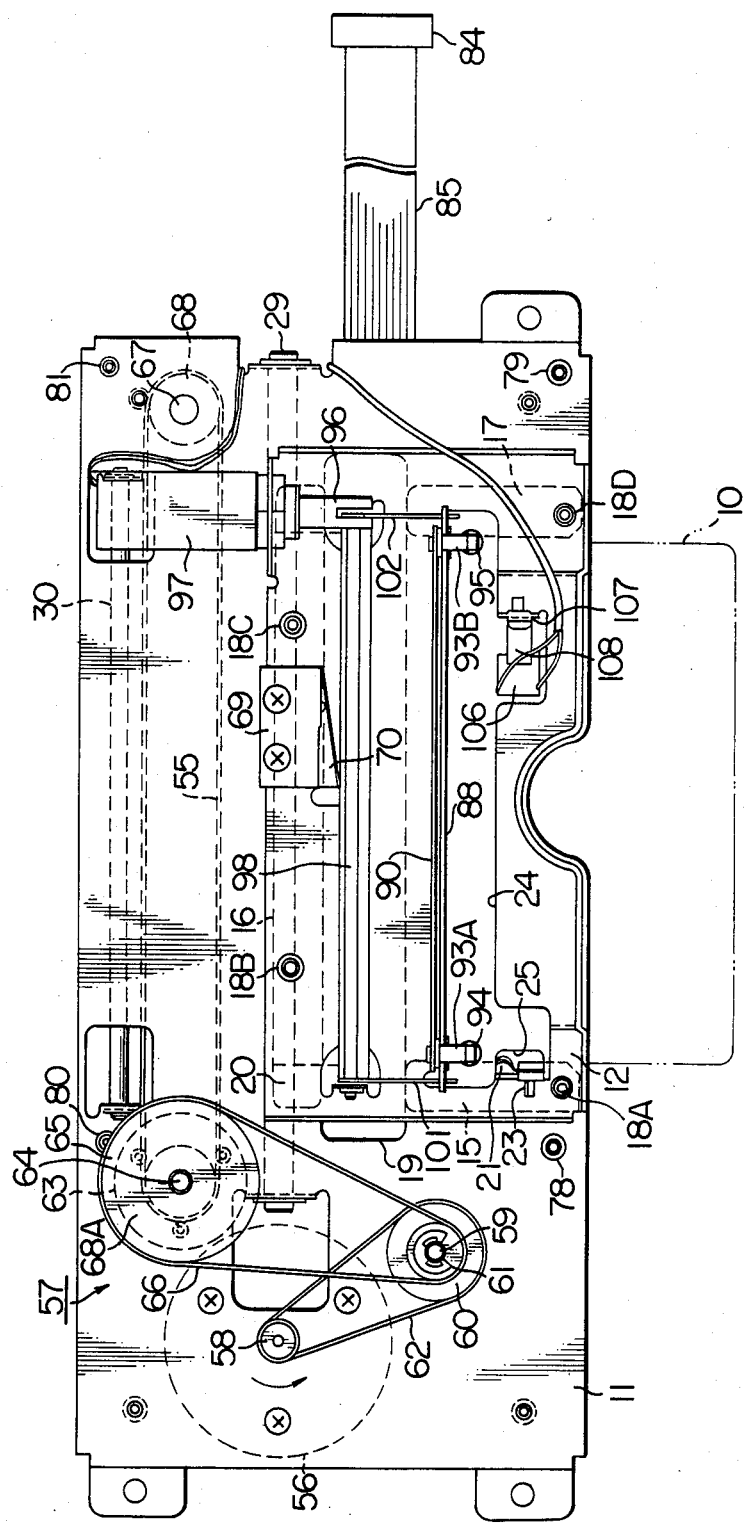
FIG. 1 is a top plan view of a card reader according to an embodiment of the invention.

Now, the present invention will be described in detail in conjunction with exemplary embodiments thereof by referring to the drawings.

Figure 3:
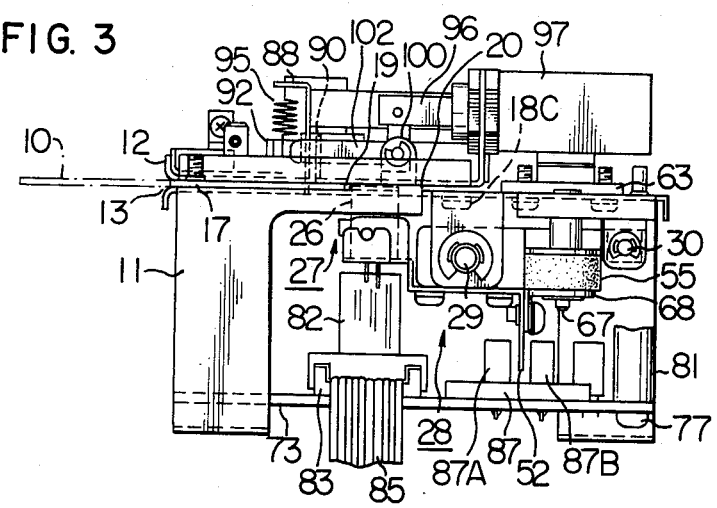
FIG. 3 is a side view of the same as viewed from the right in FIGS. 1 and 2.

At first, reference is made to FIGS. 1, 2 and 3 which show a magnetic card reader apparatus according to an embodiment of the invention in a plan view, a front view and a right side view, respectively.

Figure 4:
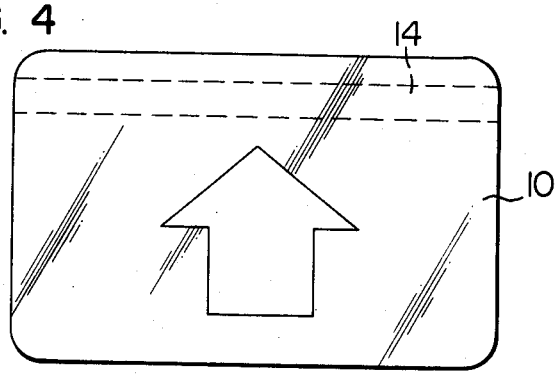
FIG. 4 is a plan view of a magnetic card from which information is to be read out.

In these figures, a reference numeral 10 denotes a magnetic card which is adapted to be inserted into and withdrawn from a card passage 13 (refer to FIGS. 2 and 3) defined between a base 11 and a holder 12, both being made of a metallic material. The magnetic card 10 is shaped in an elongated rectangular form as shown in FIG. 4 and has a predetermined thickness. The magnetic card 10 may preferably be made of a plastic or resin material and has a rear major surface provided with a magnetic recording band-like zone 14 extending in the longitudinal direction. An arrow marked on a front surface of the card (see FIG. 4) indicates the direction in which the card is to be inserted into the card reader apparatus. Except for the provision of this arrow mark, the magnetic card 10 is similar to those used ordinarily.

The base 11 and the holder 12 are formed of a sheet metal through a press working and constitute what is herein referred to as the guide members. Details of configurations of the base 11 and holder member 12 will be readily understood by examining FIGS. 5 and 6 which show, respectively, these members by itself in a plan view, in addition to FIGS. 1 to 3.

Figure 7:
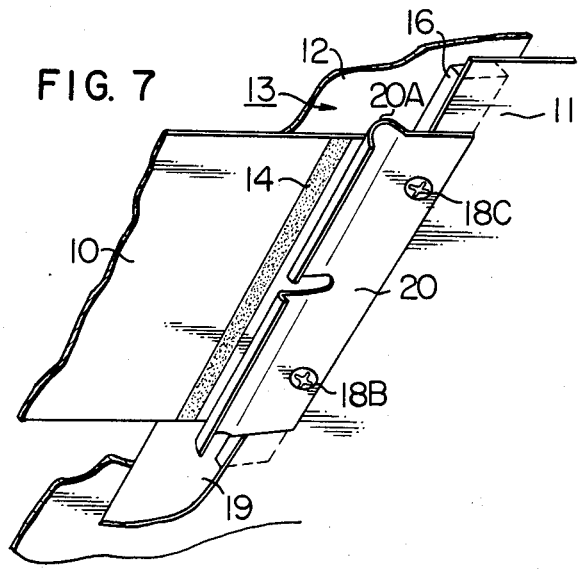
FIG. 7 shows in a fragmental perspective view a first pressing resilient member (20)

Referring to FIGS. 5, 6 and 7 in combination with FIGS. 1 and 2, the holder member 12 is secured to the base member 11 by means of screws 18A, 18b, 18C and 18D with three spacers 15, 16 and 17 being interposed therebetween. The spacer members 15, 16 and 17 are made of a synthetic resin in a predetermined thickness which determines the gaps or height of the aforementioned card passage 13, which in turn determines the thickness of the magnetic card 10 to be accepted by the present card reader. It should be mentioned that in the case of the illustrated apparatus, the gap or height of the card passage 13 is selected slightly greater than the thickness of the typical magnetic card. On the other hand, the spacers 15 and 17 located at the lefthand and the righthand sides, respectively, as viewed in FIG. 5 have respective opposite side faces which impose restriction on the width (longitudinal dimension in general) of the magnetic card 10, while the center or mid spacer 16 has a lateral surface facing toward the card passage 13 which determines the admissible length (widthwise dimension) of the magnetic card 10 to be inserted into the passage 13. In FIGS. 1 and 3, the magnetic card 10 is shown in the state in which it has been inserted through the card passage 13 until the card bears against the center spacer 16. The position of the magnetic card 10 inserted fully to the limit defined by the center spacer 16 in this manner is referred to as the card information or data reading position of the present card reader apparatus and in this condition a part of the magnetic card 10 is exposed from the passage 13.

In the course of manufacture, the spacers 15, 16 and 17 described above are provisionally mounted on the base member 11 through an outsert working, as is shown in FIG. 5, and substantially fixedly secured to the base 11 when the holder member 12 is secured to the base 11 by means of the screws 18.

Referring to FIG. 5, there is formed in the base 11 at a location which corresponds to the position of the recording band-like zone 14 of the magnetic card 10 fully inserted into the card passage 13 an elongated hole or opening 19 which allows movement of a magnetic head, as will hereinafter be described.

A pair of resilient members 20 and 21 are provided to press and hold therebetween the magnetic card 10 inserted into the card passage 13 under a spring force. Due to this spring force, the resilient members 20 and 21 therefore constitute pressing members.

More particularly, referring to FIGS. 1, 3 and 7, the first resilient member 20 is constituted by a metallic plate spring provided with a protrusion 20A of an arcuate cross-section formed along the free edge of the plate spring, and is secured to the base 11 by means of the screws 18B and 18C. The protrusion 20A projects toward the holder 12 within the card passage 13 so that the resilient member 20 is resiliently bent downwardly upon insertion of the magnetic card 10 into the card passage 13, whereby the card 10 is positively held between the holder 12 and the protrusion 20A of the plate spring (i.e. the first resilient member) 20 under the restoring force thereof acting on the inserted card 10 in the thicknesswise or upward direction.

The second resilient member 21 is composed of a metallic leaf spring having an arm provided with a protrusion 21A of an arcuate cross-section, as is shown in FIGS. 1 and 2. One end portion of the arm of the leaf spring 21 is fixedly secured by means of a screw 23 to an upright ear 22 formed integrally with the holder 12. The protrusion 21A extends transversely across an opening 24, the lefthand portion of the card passage 13 and a small aperture 25 of the base 11 in such a disposition that when the magnetic card 10 is inserted into the card passage 13 the protrusion 21A is brought into contact with the lefthand side of the card 10 to be resiliently fixed toward the left as viewed in FIGS. 1 and 2 so that a spring force may be applied to the magnetic card 10 in the widthwise or rightward direction in opposition to which the magnetic head is initially moved, to thereby hold stationarily the magnetic card 10 in cooperation with the spacer 17.

In association with the card passage 13, there are mounted on the base 11 and the holder 12 various components which take parts directly or indirectly in reading-out of magnetic information from the magnetic card 10 inserted and held stationarily in the card passage 13.

These components may be functionally classified as follows:

(A) Movable assembly integrated with the magnetic head;
(B) Supporting assembly for the movable assembly;
(C) Auxiliary means for guiding the movement of the supporting assembly;
(D) Driving means;
(E) First detecting means for detecting or sensing the insertion of the magnetic card;
(F) Circuit plate;
(G) Second detecting means for detecting or sensing the movement of the supporting assembly;
(H) Opening and closing member;
(I) Third detecting means for detecting the presence of the magnetic card at the entrance of the card passage; and
(J) Electric circuits packaged in the circuit plate.

Details of these components will be individually described below in the order of the above enumeration.

(A) Movable Assembly, (B) Supporting Assembly and (C) Auxiliary Means

Generally describing with reference to FIGS. 2 and 3, the magnetic head denoted by a reference numeral 26 is integrally incorporated in the movable assembly generally denoted by 27 which includes a pair of arms extending in the reading direction of the magnetic head 26 (i.e. in the longitudinal direction of the elongated hole 19). The movable assembly 27 is supported on a supporting assembly generally denoted by 28 so as to be swingable or rotatable in the direction orthogonal to the reading direction of the magnetic head 26. The supporting assembly 28 is movable in parallel to the reading direction of the magnetic head 26 as guided by a pair of guide rails 29 and 30 which constitute what is herein referred to as the auxiliary means and which are mounted on the base 11. More particularly, the supporting assembly 28 is adapted to be reversibly moved to the left or right along the guide rails 29 and 30 by the driving means described hereinafter, as a result of which the reading point of the magnetic head 26 at which information is read out from the magnetic card 10 is caused to move over the recording zone of the magnetic card 10 with the magnetic head 26 projecting slightly beyond the elongated hole 19.

FIGS. 8 to 11 show particulars of the movable assembly 27 and the supporting assembly 28.

Referring to these figures, the movable assembly 27 includes a holder frame 31 which is made of a synthetic such as, for example, ABS resin and serves for holding the magnetic head 26 press-fitted therein in the direction indicated by a blank arrow (see FIG. 9), a leaf spring 36 made of a metallic spring material such as spring grade stainless steel, phosphorus-bronze alloy or beryllium-copper alloy and provided with lateral resilient arms 32 and 33 extending laterally to the left and the right, respectively, as viewed in FIG. 9, and rod-like elements 34 and 35 made of a synthetic resin such as, for example, ABS resin and mounted at the free ends of the resilient arms 32 and 33, respectively, of the leaf spring 36. The rod-like elements 34 and 35 are of a circular cross-section. The holder frame 31, the leaf spring 36 and the rod-like elements 34 and 35 are realized in an integral structure through an insert molding. It should be added that the leaf spring 36 is provided with an aperture of a size sufficiently large for the magnetic head 26 to extend therethrough, although not illustrated in particular.

The first rod-like element 34 is of a cylindrical configuration and has a mid portion of reduced diameter. In contrast, the second rod-like element 35 is simply of a cylindrical configuration.

The supporting assembly 28 is composed of a metallic holding fixture 37 for supporting the movable assembly 27 and a carriage 38 made of a synthetic resin such as, for example, PAC resin, the carriage 38 being provided with holes 50 and 51 through which the guide rails 29 and 30 are inserted, respectively. The holding fixture 37 is formed of a sheet metal through a press working and secured to the carriage 38 by means of screw 39 and 39A.

As will be more apparent by referring to FIG. 11 in particular, the holding fixture 37 includes four erected supporting pieces 40, 41, 42 and 43. The erected piece 40 is provided with a recess 44 in which the mid reduced portion of the first rod-like element 34 of the movable assembly 27 is engaged, while the erected supporting piece 41 is provided with a similar recess or notch 45 in which the second rod-like element is engaged at a predetermined location. The two inner erected supporting pieces 42 and 43 are formed in a L-like configuration and have respective projections 46 and 47 for pressing downwardly the resilient arms 32 and 33, respectively, of the movable assembly 27 in the vicinity of the holding frame 31. Each of the projections 46 and 47 has a horizontal or flat lower surface.

The movable assembly 27 is fitted onto the holding fixture 37 in the state in which the resilient arms 32 and 33 are arcuately bent under pressure. This fitting operation can be accomplished in an extremely facilitated manner. In the fitted or mounted state illustrated in FIG. 9, both the rod-like elements 34 and 35 of the movable assembly 27 are pressed upwardly (i.e. in the direction toward the reading point of the magnetic head 26) by the two outer erected pieces 40 and 41 of the holding fixture 37 and supported by the recesses 44 and 45 formed in these pieces 40 and 41, respectively (see FIG. 11). Further, the two resilient arms 32 and 33 of the movable assembly 27 are pressed downwardly (i.e. in the direction to be away from the reading point of the magnetic head 26) by the pair of the inner erected pieces 42 and 43 of the holding fixture 37 and held in contact with the horizontal lower surfaces of the projections 46 and 47 (FIG. 11), respectively.

In the state held by the holding fixture 37, the resilient arms or pieces 32 and 33 of the movable member 27 are urged or biased in the direction indicated by the blank arrow in FIG. 9, wherein the initial load of the resilient arms 32 and 33 is set. At that time, each of the resilient arms 32 and 33 exerts an upwardly directed force of predetermined magnitude, as the result of which the upper surfaces of the resilient pieces 32 and 33 are caused to bear against the horizontal lower surfaces of the projections 46 and 47 (FIG. 11) of the inner erected pieces 42 and 43, respectively, whereby the movable assembly 27 is stably positioned in the horizontal direction. In this way, the magnetic head 26 is held in the state in which the data reading point located at the top of the head 26 is positioned within the card passage 13.

When information is to be read out from the magnetic card 10, the magnetic head 26 is pressed downwardly since the reading points thereof are brought into contact with the card 10. At that time, however, the magnetic head 26 is urged upwardly under the resilient force exerted by the resilient arms or pieces 32 and 33.

Unless the magnetic card 10 is inserted correctly in the horizontal disposition or when the card itself is deformed, the magnetic head 26 is not only pressed downwardly but also caused to rotate in the direction perpendicular to the reading direction (i.e. in the direction perpendicular to the plane of the drawing) as the reading points of the magnetic head are contacted intimately with the recording zone of the magnetic card. At that time, the two rod-like elements 34 and 35 are also rotated around the axes thereof, respectively, to thereby sustain the rotational axis of the whole movable assembly 27. Upon rotation of the whole movable assembly 27, the resilient arms 32 and 33 can be no more kept in the horizontal state in wich these resilient arms or pieces 32 and 33 are in close or intimate contact with the lower horizontal surfaces of the positioning erected pieces 42 and 43, respectively, but undergo twist which corresponds to magnitude of the rotation. Then, the resilient arms or pieces 32 and 33 react in the direction to cancel the twist, whereby the contact of the magnetic head 26 with the magnetic card 10 is further increased.

The movable assembly 27 is substantially prevented from moving in the reading or transverse direction, because the reduced diameter portion of the first rod-like element 34 disposed at the lefthand side engages in the recess 44 formed in the erected or upright piece 40 of the holder fixture.

The carriage 38 is composed of a main body provided with a bore 50 fitted with slide bushes 48 and 49 and a projecting arm formed integrally with the main body and having a bore 51 formed at a free end portion. The bores 50 and 51 slideably receive therethrough the straight guide rails 29 and 30, respectively, of the circular cross-section, which serve as the auxiliary means for assuring the smooth movement of the supporting assembly 28 in the reading direction in cooperation with the movable assembly 27. Upon movement, the supporting assembly 28 is supported by the two guide rails 29 and 30 to thereby positively move the magnetic head 26 along the elongated hole 19 in the horizontal direction.

As can be seen from FIGS. 1 to 3, the guide rails 29 and 30 are secured at both ends to ears formed integrally with the base 11 and depending therefrom vertically downwardly by means of E-rings. It goes without saying that both the guide rails 29 and 30 extend in parallel with the elongated hole 19.

The holder fixture 37 includes a tongue 52 to which a clamping member 54 (FIGS. 8 and 10) is mounted by means of a screw 53. The free end of the clamping member 54 is pressed against the rear surface of the main body of the carriage 38 with a driving belt 55 being held under pressure between the clamping member 54 and the carriage 38 in a sandwiched manner.

(D) Driving Means

The driving means includes an electric motor 56 as the driving power source, an endless belt 55 connected to the supporting assembly 28 and adapted to be moved over a region extending in parallel with the elongated hole 19, and a transmission mechanism 57 for transmitting a driving torque of the motor 56 stably to the endless belt 55 at a given reduction ratio. The driving means will be elucidated below in more detail by referring to FIGS. 1 to 3.

The electric motor 56 is fixedly secured to the lower surface of the base 11 by means of screws and has a driving shaft projecting upwardly beyond the plane of the base 11 with a pulley 58 being secured to the projecting end of the shaft. Secured to and extending upwardly from the base 11 is a stud 59 on which pulleys 60 and 61 are mounted freely rotatable. More specifically, the pulley 60 is secured to the pulley 61 so as to be rotatable as an integral unit. An endless belt 62 of rubber is supported under tension between the pulley 60 and the pulley 58 which is fixedly mounted on the drive shaft of the electric motor 56. Extending through and secured to the base 11 by means of screws is a bearing 63 which serves to support rotatably a shaft 64 whose top end portion is positioned above the base 11 and has a pulley 65 secured thereto. An endless belt 66 of rubber is supported under tension between the pulleys 61 and 65. Secured to and projecting downwardly from the base 11 is a stud 67 on which a pulley 68 is mounted rotatably around its axis. The pulley 68 has a same diameter as that of a pulley 68A fixedly mounted on the shaft 64. A line passing the rotational centers of these pulleys 68 and 68A extends in parallel with the elongated opening 19 and the guide rails 29 and 30.

The endless belt 55 of rubber runs between the pulleys 68 and 68A under tension. The region in which the belt 55 is moved extends in parallel with the elongated hole 19. The supporting assembly 28 is coupled to the endless belt 55 through the clamping means (53, 54) described hereinbefore (FIG. 8) in such a manner that the rotation of the electric motor 56 in the forward direction (indicated by an arrow in FIG. 1) results in the counterclockwise rotation of the individual pulleys and the belts, involving the movement of the magnetic head 26 to the right as viewed in FIG. 1. On the other hand, the reverse rotation of the electric motor 56 causes the magnetic head 26 to be moved to the left as viewed in FIG. 1. Since the transmission mechanism includes three endless belts 55, 62 and 66 each made of rubber, variations or fluctuations in rotation of the driving system is absorbed by these transmission belts, whereby the magnetic head 26 can be moved in a stabilized manner.

(E) First Detecting Means

As is shown in FIG. 1, a limit switch 69 is disposed on the upper side of the holder 12 and secured to the base 11 by means of screws. The limit switch 69 has a movable element 70, free end portion of the element 70 being bent downwardly and extending into the elongated hole 19 through a hole 71 (FIG. 6) formed in the holder 12 and a notch 72 (FIG. 5) formed in the mid spacer 16.

When the magnetic card 10 is inserted until it becomes in contact with the mid spacer 16, the limit switch 69 produces a detection signal.

(F) Circuit Board

Referring to FIG. 2, a printed circuit plate or board 73 of a rectangular planar configuration is secured to the base by means of screws 74, 75, 76 and 77 and threaded bolts 78, 79, 80 and 81 (each having a female thread formed at one end and a male thread at the other end). The distance between the base 11 and the printed circuit board 73 which extends in parallel with the base 11 is determined by the threaded bolts 78, 79, 80 and 81.

Incorporated in the circuit board 73 are a processing circuitry for processing signals read out through the magnetic head 26 as well as a circuitry which supplies electric signals to the electric motor 56 and the other electrically operative components, and a circuitry for processing the detection signals supplied from the group of the detecting means.

A flexible printed circuit plate 82 is used as leads for electrically connecting the electric terminals of the magnetic head 26 to the circuit board 73 and serves to transmit the signals read out by the straight moving magnetic head 26 to the circuit board 73. Connectors 85 are provided for receiving power supply from external apparatus and for transmission and reception of various electric signals.

Details of the circuitries incorporated in the circuit board 73 will be described hereinafter by referring to FIG. 14.

(G) Second Detecting Means

As is shown in FIG. 2, a pair of optical sensors (photosensors) 86 and 87 are mounted on the circuit board 73, respectively, at two positions aligned with a tongue 52 of the supporting assembly 28. One position corresponds to the left limit of the range in which the magnetic head 26 is allowed to move and is referred to the home position, while the other position corresponds to the right limit of that range and is referred to as the turn-back position.

Each of the optical sensors 86 and 87 is composed of a base (attached with no reference symbol), a light emitter 87A and a light receiver 87B (see FIG. 3) which are disposed in opposition to each other with a predetermined gap which allows the tongue 52 to move between the light emitter 87A and the light receiver 87B. Each of the photosensors 86 and 87 serve to produce a position signal indicating whether the magnetic head 26 is in such a position at which the tongue 52 of the supporting assembly 28 intercepts the optical path extending between the light emitter 87A and the light receiver 87B. The position signal is processed by an associated circuit included in the circuit board 73 so as to produce a timing signal in response to which the electric motor 56 is caused to reverse the direction of its rotation when the magnetic head 26 activated reaches at the right limit or turn-back position of the range in which the reading operation is effected.

Other timing signal produced through the processing mentioned above serves to stop the electric motor 56 when the latter has regained the left limit or home position.

(H) Opening/Closing Member

Referring to FIGS. 1 to 3, a numeral 88 denotes an intercepting plate made of a metal which permits or prohibits the insertion of the magnetic card 10 on the way by opening or closing the card passage 13. There are formed a pair of elongated apertures 89A and 89B in the intercepting plate 88 (refer to FIG. 12) which is supported vertically movably relative to the holder 12. More specifically, the holder 12 includes an upwardly erected ear 90 in front of the elongated hole or aperture 19. A pair of pins 91 and 92 each having a reduced diameter portion are mounted on the erected ear 90 at the left and the right ends, respectively. The intercepting plate 88 is mounted on the pins 91 and 92 inserted through the elongated apertures 89A and 89B, respectively, and held in place by means of E-rings (attached with no reference symbol). By selecting appropriately the dimension and the position of the elongated holes 89A and 89B, the intercepting plate 88 can be selectively set at a first position where it extends from the opening of the holder 12 transversely of the card passage 13, projecting downwardly through an opening 13A (FIG. 5) formed in the base 11, to thereby close the card passage 13 and a second position where the card passage 13 is opened to the degree which substantially corresponds to the thickness of the spacers 15, 16 and 17.

The intercepting plate 88 has bent pieces 93A and 93B at positions corresponding to the pins 91 and 92, respectively. A coil spring 94 is disposed between the bent piece 93A and the pin 91 on one hand, while a spring 95 is disposed between the bent piece 93B and the pin 92 on the other hand (refer to FIGS. 2 and 3). Under the influence of these coil springs 94 and 95, the intercepting plate 88 is constantly urged downwardly to the position where the card passage 13 is closed to prevent the card or others from entering farther beyond the position of the intercepting member 88.

An electromagnetic driving unit 97 (FIG. 3) having a reciprocatable plunger 96 is secured to the holder 12 by means of screws. A shaft 98 (FIG. 1) is rotatably mounted on upwardly erected pieces 99 and 100 of the holder 12 (see FIG. 6) and held in place by means of E-rings. A lifting link 101 made of a sheet metal in such a configuration as shown in FIG. 13 is mounted on the shaft 98 rotatably around the axis thereof. The link 101 is provided with an erected member 102 which serves for force transmission and has an elongated hole or slot formed therein, at which the plunger 96 of the electromagnetic drive unit 97 is connected to the link 101 by means of a spring pin (not denoted). When the plunger 96 is withdrawn (upon energization of the electromagnetic solenoid), the link 101 is caused to rotate in the clockwise direction as viewed in FIG. 3, as a result the end projections of the link 101 engage in offset portions 103A and 103B of the intercepting plate 88 (FIG. 12) to lift or move upwardly the latter, whereby the card passage 13 is opened to allow the magnetic card 10 to be inserted. At that time, since both the end projections of the link 101 act simultaneously on the offset portions 103A and 103B of the intercepting plate 88, the latter can be smoothly moved upwardly.

(I) Third Detecting Means

A light receiver element 103 is secured to a downwardly projecting ear 104 formed integrally with the base 11 by means of a screw with a mounting member 105 being interposed between the element 103 and the ear 104, while a light emitting element 106 is secured to an ear 107 projecting upwardly toward the holder 12 by means of a screw with a mounting member 108 being interposed between the element 106 and the ear 107, wherein the light receiver element 103 and the light emitting element 106 are disposed in opposition to each other and exposed to the card passage 13 through apertures left when the respective supporting ears 104 and 107 are formed. When the magnetic card 10 is inserted into the card passage 13 and attains a position where the optical path between the light emitting element 106 and the light receiving element 103 is intercepted by the card 10, the third detecting means constituted by these photo-elements 103 and 106 produces a detection signal which is then supplied to an electric circuitry incorporated in the circuit board 73 to be processed to produce a command signal for energization of the electromagnetic driving unit 97 to thereby permit the passage of the magnetic card 10.

(J) Electric Circuits

Figure 14:
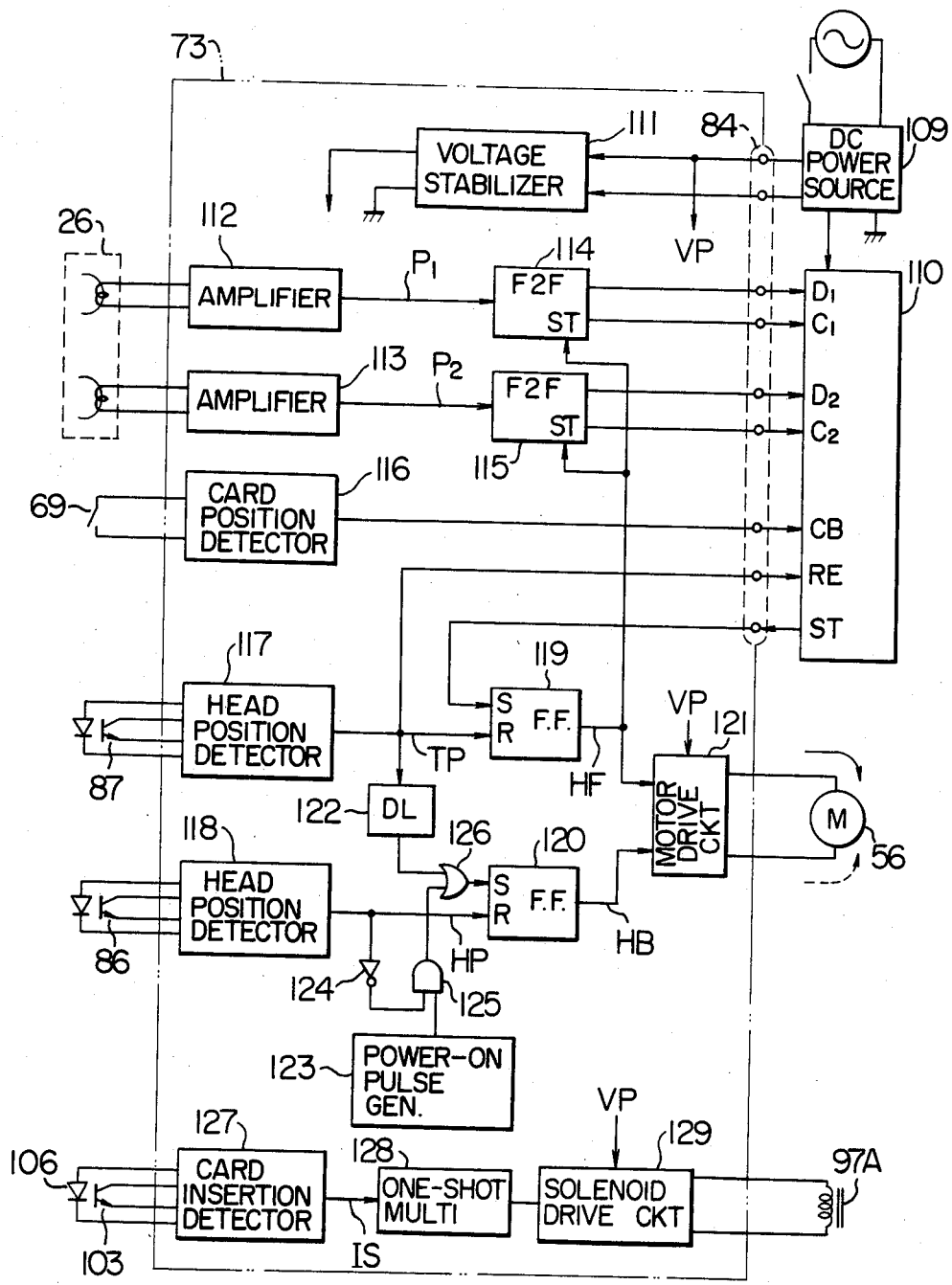
FIG. 14 is a block diagram showing an arrangement of an electric circuit employed in the magnetic card reader.

FIG. 14 shows in a circuit diagram the circuits incorporated in the circuit board 73, electric components and external apparatus connected to the circuits.

An utilization apparatus 110 is provided externally of the magnetic card reader and supplied with binary information or data signals read out from the magnetic card 10 through the connector 84. A power supply circuit 109 is connected to a commercial AC line and serves to convert the AC voltage to a stepped-down DC voltage which is supplied to the circuit board 73 of the magnetic card reader. The DC voltage applied to the circuit board 73 is first regulated to a predetermined voltage by a voltage stabilizer circuit 111, which voltage is supplied to the various circuitries except for the driving circuit.

The magnetic head 26 is of a two-channel configuration. Amplifier circuits 112 and 113 are provided for the two channels, respectively, for amplifying the read out signals of the respective channels. Rectangular pulse trains P1 and P2 outputted from the amplifiers 112 and 113 are supplied to demodulator circuits 114 and 115, respectively, to be separated into data trains D1 and D2 and synchronizing clock trains C1 and C2, respectively, which are then supplied to the utilization apparatus 110.

A detection circuit 116 receives the detection signal produced by the micro-switch 69 (FIG. 1) and sets a "PRESENCE OF CARD" signal CB at a significant level, indicating that the magnetic card 10 is present at a predetermined read-out position, when the card 10 is inserted into the card passage 13 to the read-out position. In response to the "PRESENCE OF CARD" signal CB of the significant level, the utilization apparatus 110 checks whether it is in the state to receive the data train and the clock train. If the result of the check has proven affirmative, a "START" signal ST is set at the significant level for a predetermined time interval to initiate the movement of the magnetic head 26.

Detector circuits 117 and 118 are connected to the photosensors 87 and 86, respectively. When the magnetic head 26 is located at the turn-back position defined hereinbefore, the detector circuit 117 produces a position signal TP of the significant level in response to the output signal of the photosensor 87, while the detector circuit 118 produces a position signal HP of the significant level in response to the output signal of the photosensor 86 when the magnetic head 26 is located at the home position also defined hereinbefore. In this connection, it should be mentioned that the turn-back signal TP is also made use of as a "READ END" signal RE indicating that the going stroke (forward movement) of the magnetic head 26 has been completed. This "READ END" signal RE is supplied to the utilization apparatus 110 to be utilized for invalidating the input information derived from the return stroke (backward movement) of the magnetic head when only the forward read operation of magnetically recorded information is permitted.

To command selectively the forward and the reverse rotation of the electric motor 56, there are provided two flip-flop circuits 119 and 120 in combination with a motor driving circuit 121, The first flip-flop circuit 119 produces a forward rotation sustaining or holding signal HF of the significant level during a period elapsing from a time point at which a "START" signal ST of the significant level is produced by the utilization apparatus 110 to a time point at which the turn-back position signal TP of the significant level makes appearance. On the other hand, the second flip-flop circuit 120 produces a reverse rotation sustaining (or holding) signal HB of the significant level during a period from a time point at which a delay time determined by a delay circuit 122 has elapsed since the appearance of the turnback signal TP of the significant level to a time point at which the home position signal HF of the significant level makes appearance. The motor driving circuit 121 incorporates therein a circuitry for changing over the polarity of the current supplied to the electric motor 56 to assure that a current of the direction indicted by a solid line arrow is supplied to the electric motor 56 to cause it to rotate in the forward direction so long as the forward rotation sustaining signal HF is at the significant level, while the current of the direction indicated by a broken line arrow is supplied to the electric motor 56 to cause it to rotate in the backward or reverse direction when the reverse rotation sustaining signal HB is at the significant level. The delay circuit 122 serves to delay the time point at which the reverse rotation sustaining signal HB takes the significant level so that the end of the forward rotation of the motor 56 is not immediately followed by the reverse rotation but with a delay determined by the delay circuit 122. The forward rotation sustaining signal HF is additionally supplied to the demodulating circuits 114 and 115 as an enabling signal indicating the operation period thereof.

A power-on pulse generator 123, an inverter 124, an AND gate 125 and an OR gate 126 cooperate to constitute a positioning circuit for positioning positively the magnetic head 26 at the home position at the time when the power supply to the magnetic card reader is turned on. More specifically, the power-on pulse generating circuit 123 responds to the rising edge of the output voltage from the voltage stabilizer circuit 111 to produce a pulse signal of a predetermined duration which enables (i.e. opens) the AND circuit 125. Unless the magnetic head 26 is located at the home position at that time, the signal of the significant level appearing at the output of the inverter circuit 124 is conducted through the gate circuits 125 and 126 to set the second flip-flop 120 in the hold state, which continues to be present until the home position signal HP takes the significant level, indicating that the magnetic head 26 lies at the home position.

A card insertion detecting circuit 127 is connected to the photo-array constituted by the light emitting element 106 and the light receiving element 103 and adapted to produce an "INSERTION STAT" signal IS of the significant level in response to variation in the intensity of light incident to the light receiving element 103 upon insertion of the magnetic card into the card passage 13. In response to the "INSERTION START" signal IS of the signifcant level, a one-shot multivibrator 128 produces a pulse signal of a predetermined duration (pulse width) which is supplied to a solenoid driving circuit 129 to energize the solenoid 97A of the electromagnetic driving device 97 for a predetermined time, whereby the plunger 96 is maintained at the withdrawn position. After lapse of the predetermined time, the solenoid 97A is deenergized.

In the foregoing, the structure of the magnetic card reader has been described in detail. Next, operation of the card reader as a whole will be considered.

At first, when the power supply from the DC power source circuit 109 is turned on, it is determined by the associated electric circuit on the basis of the detection signal produced by the photosensor 86 whether the tongue 52 of the supporting assembly 28 is at the position where the optical path of the sensor 86 is intercepted by the tongue 52, i.e. whether the magnetic head 26 lies at the home position. Unless the magnetic head 26 is at the home position, the flip-flop circuit 120 is set to the hold state in which the electric motor 56 is rotated in the backward or reverse direction to thereby cause the magnetic head 26 to be returned to the home position.

The intercepting or blocking plate 88 is urged downwardly under the influence of the coil springs 94 and 95, as the result of which the card passage 13 is closed to prevent foreign materials from entering the card passage 13.

When the magnetic card 10 is placed at the entrance of the card passage 13, the optical path of the photosensor (103, 106) is intercepted by the magnetic card 10. As a consequence, the electromagnetic driving unit 97A is electrically energized by the solenoid driving circuit 129 for the predetermined time, whereby the plunger 96 is withdrawn to lift up the intercepting member 88 through the lifting link 102. In this way, the card passage 13 is opened to permit further insertion of the magnetic card 10.

When the electromagnetic driving unit 97 is deenergized, the intercepting plate 88 is moved under the restoring force of the coil springs 94 and 95 to close the card passage 13. At that time, the intercepting plate 88 is so positioned that the bottom edge thereof is in contact with the upper surface of the magnetic card 10. Accordingly, the card passage 13 can be completely closed only after the magnetic card 10 is withdrawn outwardly.

When the magnetic card 10 is inserted into the card passage to such degree that its leading edge bears against the mid spacer 16, the first resilient member 20 acts on the magnetic card 10 to press the latter onto the holder 12 in the direction thicknesswise of the card 10, while the second resilient member 21 applies a force to the magnetic card 10 in the longitudinal direction to press it against the spacer 17. Thus, the magnetic card 10 is positively held within the card passage 13 under the spring forces exerted by the first and second resilient members 20 and 21.

In the inserted or accepted state of the magnetic card 10 mentioned above, the micro-switch 69 produces the detection signal as described hereinbefore. In response to this detection signal, the electric circuit supplies the "PRESENCE OF CARD" signal CB to the utilization apparatus 110. When the "START" signal ST is supplied from the utilization apparatus 110, the flip-flop 119 is set to the hold state, whereby the electric motor 56 is rotated in the forward direction.

As the motor 56 is rotated, the endless belt 55 is moved at a constant speed, resulting in that the supporting assembly 28 is moved along the guide rails 29 and 30 to the right as viewed in FIGS. 1 and 2. The magnetic head 26 supported by the supporting assembly 28 projects into the card passage 13 through the elongated hole 19 and moves slidingly on and along the magnetic recording zone 14 of the magnetic card 10. When the magnetic head 26 is brought into contact with the magnetic card 10, the latter is pressed downwardly, whereby the resilient arms 32 and 33 of the movable assembly 27 tend to be further flexed downwardly. Thus, the magnetic head 26 is adequately pressed against the magnetic recording zone 14 under the restoring spring force of the resilient arms or pieces 32 and 33. As described hereinbefore, the magnetic head 26 is susceptible to the rotation in the direction perpendicular to the reading direction. Accordingly, the magnetic head 26 can be maintained in intimate contact with the recording zone 14 of the magnetic card 10 during the movement regardless of more or less inclination and/or deformation of the card 10.

The data signals read out in two channels in the course of the movement of the magnetic head 26 are demodulated by the electric circuit and sent out to the utilization apparatus 110.

When the tongue 52 of the supporting assembly 28 intercepts the optical path of the optical sensor 87 at the turn-back position of the magnetic head 26, the first flip-flop 119 of the electric circuit is reset (i.e. released from the hold state), while the second flip-flop 120 is set to the hold state with the predetermined delay relative to the resetting of the first flip-flop 119, whereby the electric motor 56 is caused to rotate in the reverse or backward direction. Consequently, the moving direction of the endless belt 55 is reversed to cause the supporting assembly 28 to move in the reverse or backward direction along the guide rails 29 and 30. In this case, the magnetic head 26 is moved in intimate contact with the magnetic card 10 under the action of the resilient arms or pieces 32 and 33 of the movable assembly 27.

When the magnetic head 26 reaches the home position, the optical sensor 86 produces the corresponding detection signal in response to which the second flip-flop circuit 120 is reset (i.e. released from the hold state) to thereby stop the electric motor 56.

Thus, the single reading operation of the magnetic card reader is completed. It should however be mentioned that the magnetic card reader is suited to a number of repeated read-out operations as well. More specifically, when the utilization apparatus 110 finds an error in the data supplied from the electric circuit, by way of example, the first flip-flop circuit 119 can be again set to the hold state by causing the "START" signal ST to assume the significant level for a predetermined time. In this way, the forward and the reverse rotation of the electric motor 56 can be repeated as desired. In the present card reader apparatus, the magnetic card 10 inserted into the card passage 13 can be arbitrarily withdrawn regardless of whether the magnetic head 26 is in motion or not. When the card 10 is withdrawn during the movement of the magnetic head 26, the latter 26 is stopped at the home position after having performed the predetermined reading strokes.

The electromagnetic driving unit 97 is deenergized after the predetermined time elapse from the energization thereof. Thus, the intercepting plate can close or block the card passage 13 immediately after the removal of the magnetic card 10.

In the foregoing, the present invention has been described in conjunction with the preferred embodiment. However, it is apparent that modifications and variations will readily occur to those skilled in the art without departing from the spirit and scope of the present invention set forth in claims.

We claim:

1. A magnetic card reader apparatus comprising:
    guide means for defining a card passage adapted for the insertion of a magnetic card, provided with at least one elongated magnetic recording zone, for a predetermined distance in a direction which intersects the longitudinal direction of said magnetic recording zone, said guide means including pressing members for resiliently holding said magnetic card under spring force in a sandwiched manner within said card passage;
    a magnetic head for transducing magnetically recorded information to an electrical signal by slidable movement relative to the magnetic recording zone of said magnetic card;
    a movable assembly housing said magnetic head supported by a pair of resilient pieces which extend in a slidably movement direction of said magnetic head, said pair of resilient pieces supporting at the center thereof said magnetic head so that a resilient force exerted by said pair of resilient pieces presses said magnetic head against said magnetic card in a perpendicular direction with respect to the surface of said magnetic card, said pair of resilient pieces having at free ends thereof respective rod-like elements;
    a supporting assembly having a pair of supporting pieces for supporting said movable assembly pivotably at said rod-like elements in a both-end supporting fashion, said pair of supporting pieces supporting said magnetic head rotatably in a direction intersecting said slidable movement direction of the magnetic head, and said supporting assembly further including a pair of erected pieces positioned between said pair of supporting pieces for positioning said pair of supporting pieces and for restricting a rotational range of said magnetic head to a predetermined width;
    auxiliary means for guiding the movement of said supporting assembly relative to said guide means such that said magnetic head is exposed to said card passage with the slidable movement direction of said magnetic head coinciding with the direction in which said recording zone extends and that said magnetic head is moved in said reading direction; and,
    driving means for applying a driving power to said supporting assembly to thereby move said supporting assembly reversibly relative to said guide means.

2. A magnetic card reader apparatus according to claim 1, wherein said pressing members include a resilient pressing member which bears on one surface of said magnetic card and presses said card in a thicknesswise direction thereof.

3. A magnetic card reader apparatus according to claim 1, wherein said pressing members include a resilient pressing member which bears on one end face of said magnetic card and presses said card in the slidable movement direction.

4. A magnetic card reader apparatus according to claim 1, wherein said resilient pieces of said movable assembly include a leaf spring having both ends fixed, with said rod-like elements extending in the slidable movement directin of said magnetic head.

5. A magnetic card reader apparatus according to claim 1, wherein said auxiliary means includes guide rails disposed in a predetermined fixed relationship to said guide means.

6. A magnetic card reader apparatus according to claim 1, wherein said driving means includes means to actuate said driving means in response to detection of said magnetic card being inserted into said card passage at a predetermined position.

7. A magnetic card reader apparatus comprising:
guide means for defining a card passage adapted for the insertion of a magnetic card, provided with at least one elongated magnetic recording zone, for a predetermined distance in a direction which intersects the longitudinal direction of said magnetic recording zone, said guide means including pressing members for resiliently holding said magnetic card under spring force in a sandwiched manner within said card passage;
a magnetic head for transducing magnetically recorded information to an electrical signal by slidable movement relative to the magnetic recording zone of said magnetic card;
a movable assembly housing said magnetic head supported by a pair of resilient pieces which extend in a slidable movement direction of said magnetic head, said pair of resilient pieces supporting at the center thereof said magnetic head so that a resilient force exerted by said pair of resilient pieces presses said magnetic head against said magnetic card in a perpendicular direction with respect to the surface of said magnetic card, said pair of resilient pieces having at free ends thereof respective rod-like elements;
a supporting assembly having a pair of supporting pieces for supporting said movable assembly pivotably at said rod-like elements in a both-end supporting fashion, said pair of supporting pieces supporting said magnetic head rotatably in a direction intersecting said slidable movement direction of the magnetic head, and said supporting assembly further including a pair of erected pieces positioned between said pair of supporting pieces for positioning said pair of supporting pieces and for restricting a rotational range of said magnetic head to a predetermined width;
auxiliary means for guiding the movement of said supporting assembly relative to said guide means such that said magnetic head is exposed to said card passage with the slidable movement direction of said magnetic head coinciding with the direction in which said recording zone extends and that said magnetic head is moved in said slidable movement direction;
driving means for applying a driving power to said supporting assembly to thereby move said supporting assembly reversibly relative to said guide means;
a circuit board disposed in a predetermined fixed relationship to said guide means and having surfaces extending in parallel to the direction in which said supporting assembly is moved; and
detecting means installed on said circuit board for detecting positions occupied by said supporting assembly.

8. A magnetic card reader apparatus according to claim 7, wherein said detecting means is so arranged as to detect limits of a range in which said supporting assembly is allowed to reciprocally move.

9. A magnetic card reader apparatus according to claim 7, wherein said circuit board has thereon circuit means for issuing a command to reverse the driving power supplied to said supporting assembly by said driving means in dependence on the positions taken by said supporting assembly.

10. A magnetic card reader apparatus according to claim 7, wherein said movable assembly, said supporting assembly, said auxiliary means and said circuit board are disposed at one side of said card passage in opposition thereto.

11. A magnetic card reader apparatus comprising:
guide means for defining a card passage into which a magnetic card provided with at least one elongated magnetic recording zone can be inserted for a predetermined distance in a direction which intersects the longitudinal direction of said magnetic recording zone, said guide means including pressing members for resiliently holding said magnetic card under spring force in a sandwiched manner within said card passage;
a magnetic head for transducing magnetically recorded information to an electrical signal by slidable movement relative to the magnetic recording zone of said magnetic card;
a movable assembly having said magnetic head supported by a pair of resilient pieces which extend in a slidable movement direction of said magnetic head, said pair of resilient pieces supporting at the center thereof said magnetic head so that a resilient force exerted by said pair of resilient pieces presses said magnetic head against said magnetic card in a perpendicular direction which respect to the surface of said magnetic card, said pair of resilient pieces having at free ends thereof respective rod-like elements;
a supporting assembly having a pair of supporting pieces for supporting said movable assembly pivotably at said rod-like elements in a both-end supporting fashion, said pair of supporting pieces supporting said magnetic head rotatably in a direction intersecting said slidable movement direction of the magnetic head, and said supporting assembly further including a pair of erected pieces positioned between said pair of supporting pieces for positioning said pair of supporting pieces and for restricting a rotational range of said magnetic head to a predetermined width;
auxiliary means for guiding the movement of said supporting assembly relative to said guide means in such a manner that said magnetic head is exposed to said card passage with the slidable movement direction of said magnetic head coinciding with the direction in which said recording zone extends and that said magnetic head is moved in said slidable movement direction;

driving means for applying a driving power to said supporting assembly to thereby move said supporting assembly reversibly relative to said guide means;

a closing and opening member mounted on said guiding means for prohibiting and permitting, respectively, the insertion of said magnetic card along the way to a predetermined position within said card passage; and detecting means for detecting the presence of said magnetic card on the way to said predetermined position within said card passage to thereby cause said closing and opening member to permit further insertion of said magnetic card.

12. A magnetic card reader apparatus according to claim 11, wherein said driving means is arranged so as to respond to the detection of said magnetic card inserted to the predetermined position within said card passage to be thereby activated.

13. A magnetic card reader apparatus comprising:

guide means for defining a card passage into which a magnetic card provided with at least one elongated magnetic recording zone can be inserted for a predetermined distance in a direction which intersects the longitudinal direction of said magnetic recording zone;

a magnetic head for transducing magnetically recorded information to an electrical signal in a direction of slidable movement relative to the magnetic recording zone of said magnetic card;

a leaf spring having a pair of resilient pieces fixedly supporting said magnetic head in the middle portion thereof and provided with a pair of rod-like elements at the respective longitudinal ends thereof, said pair of resilient pieces pressing with resilient force said magnetic head against said magnetic card in a perpendicular direction with respect to the surface of said magnetic card;

a supporting assembly having a pair of supporting pieces defining recesses for receiving pivotably said rod-like elements in a both-end supporting fashion respectively thereat, so that said magnetic head is rotatable in a direction intersecting said slidable movement direction of the magnetic head, said supporting assembly further including a pair of erected pieces positioned between said pair of supporting pieces for positioning said pair of supporting pieces and for restricting a rotational range of said magnetic head to a predetermined width; and driving means for electrically driving said supporting assembly in the longitudinal direction of said leaf spring so that said magnetic head is moved the direction of in said magnetic recording zone.

14. A magnetic card reader apparatus according to claim 13 further comprising:

a first resilient member provided in said card passage for resiliently pressing said magnetic card in a thicknesswise direction of said magnetic card; and a second resilient member provided in said card passage for resiliently pressing said magnetic card in a direction in which said magnetic recording zone extends.

* * * * *